Figure 1:
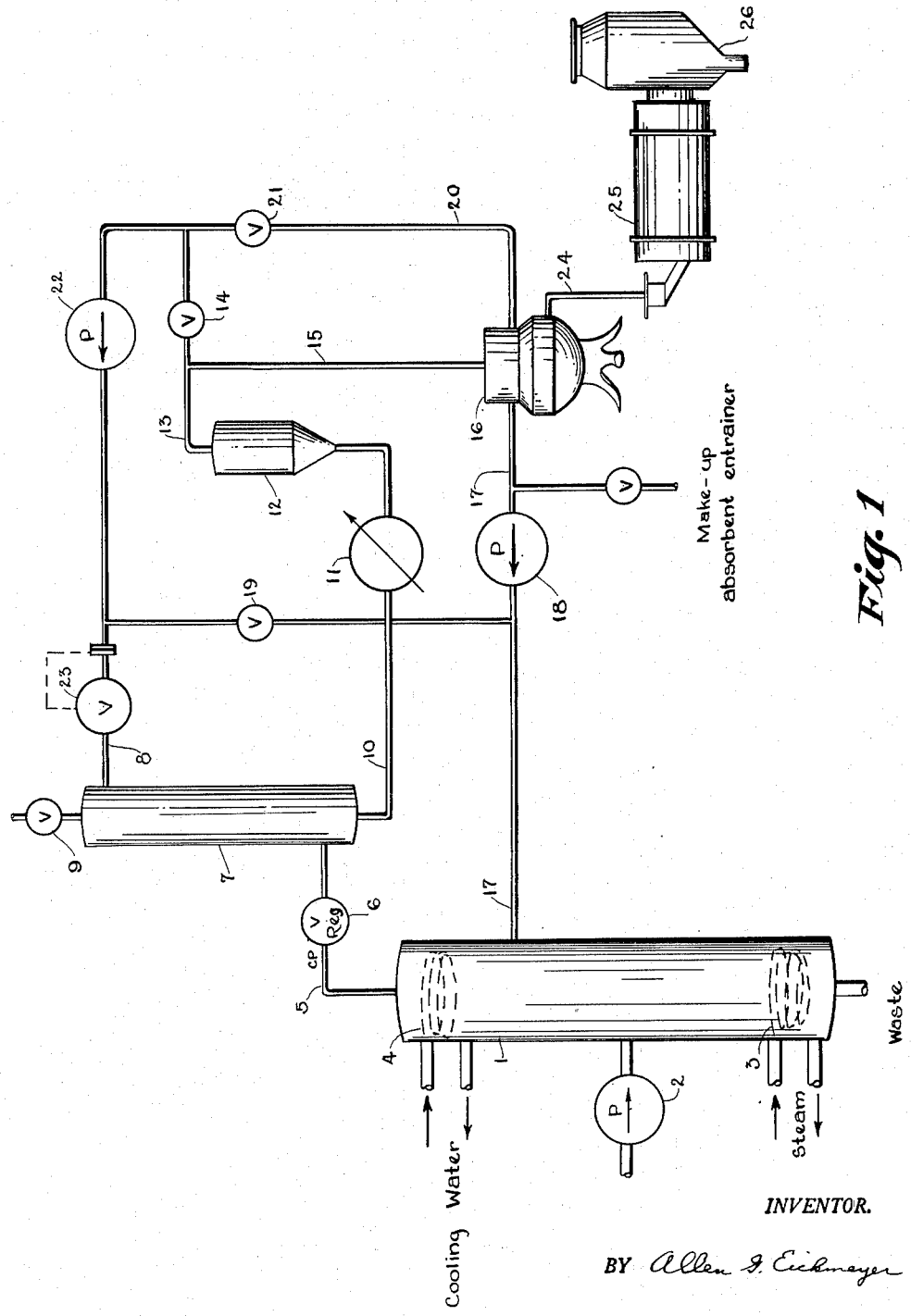

April 22, 1952

A. G. EICKMEYER 2,593,862

METHOD FOR POLYMERIZATION OF FORMALDEHYDE
AND RECOVERY OF PARAFORMALDEHYDE

Filed Nov. 19, 1948

INVENTOR.

BY Allen G. Eickmeyer

Patented Apr. 22, 1952

2,593,862

UNITED STATES PATENT OFFICE 2,593,862

METHOD FOR POLYMERIZATION OF FORMALDEHYDE AND RECOVERY OF PARAFORMALDEHYDE

Allen G. Eickmeyer, Tulsa, Okla.

Application November 19, 1948, Serial No. 61,046

4 Claims. (Cl. 260—340)

This invention relates to the production of polymers of formaldehyde, such as paraformaldehyde, and more particularly, but not by way of limitation, to a method for the polymerization of formaldehyde in a formaldehyde-absorbent liquid and the recovery of paraformaldehyde therefrom.

Paraformaldehyde, commonly called paraform, is a solid polymer of formaldehyde and is formed by a chemical reaction of formaldehyde with itself and usually with a small amount of water. At present, paraform is conventionally produced by vacuum distillation of aqueous solutions of formaldehyde, whereby water is removed overhead and paraform is formed by polymerization of formaldehyde in the bottoms concentrate. Since the operation is performed batchwise, the method is costly and the product has inconsistent chemical and physical properties.

Another method for producing paraform is described by Bludworth in Patent Number 2,257,780. By this method, formaldehyde is absorbed in ethyl ether from a formaldehyde-inert gas mixture, which is produced at about 80° F. by his invention involving pressure distillation. After a few minutes, paraform precipitates from the ether. The ether is removed by distillation, and the paraform is recovered in the anhydrous state. In spite of the tremendous economic incentive to produce paraform, this method has not been used commercially because of inherent disadvantages. For example, a finely divided precipitate is very difficult to filter. Thus, Bludworth proposed a relatively expensive method of liquid-solids separation, distillation, which is necessarily accomplished batchwise in this case because of the solids handling. It will be seen that formaldehyde polymerization and paraform precipitation and recovery steps may be performed continuously and more rapidly and economically by application of the improved methods of my invention.

A recently developed and superior method of producing paraform, employs certain volatile liquids, the vapor of which serves as a formaldehyde entrainer, and the condensate is capable of absorbing gaseous formaldehyde. Aqueous formaldehyde is distilled under superatmospheric pressure in the presence of a reflux of the entrainer liquid which is vaporized and carried overhead with gaseous formaldehyde. Upon condensing, the entrainer absorbs formaldehyde gas to form a solution in which formaldehyde polymerizes and paraform precipitates upon cooling. However, two difficulties are encountered. Upon cooling the solution to polymerize formaldehyde, the coolingf surfaces tend to become contaminated with paraform. Secondly, the fine precipitate formed is difficult to filter. The application of my invention to the polymer formation and separation steps of this method results in a well-integrated process by means of which high-quality paraform can be most economically produced.

My invention may use any suitable formaldehyde-containing stream, such as the above mentioned inert gas-formaldehyde mixture or a volatile entrainer-formaldehyde mixture. Notable differences in these two pressure distillation techniques should be emphasized because the application of my present invention requires different handling, which will be pointed out from time to time.

In case of the inert gas technique, reflux to the distillation column is water, which is condensed from the overhead stream. A relatively cold (80° F.) overhead gaseous stream is conducted through an absorber wherein an absorbent, such as ethyl ether, dissolves formaldehyde and precipitates paraform. The inert gas is recycled to the column at the third or fourth tray from the top.

In the case of the absorbent entrainer technique, reflux to the column is the volatile liquid entrainer. The column overhead vapors are hot, and gaseous formaldehyde is dissolved by the condensed absorbent entrainer. Upon cooling the solution, formaldehyde polymerizes and paraform precipitates.

In the following description and illustration of my invention, emphasis will be placed on the adaptation to the latter method (entrainer technique), however, because of the better adaptability to commercial usage.

The present invention involves the polymerization of formaldehyde by direct contact with a slurry of paraform suspended in a formaldehyde-absorbent liquid. Said liquid may be the volatile entrainer used in the method described above. The newly formed paraform is then precipitated in such a way as to alleviate the above mentioned difficulties.

An object of this invention is to provide a superior method of polymerizing formaldehyde and separating the resulting paraformaldehyde.

Another object of this invention is to precipitate paraform from a mixture of formaldehyde and an entrainer in such a manner as to reduce the tendency of cooling surfaces to become coated with solid paraform.

A further object of this invention is to precipitate paraform from a formaldehyde-absorbent liquid in such a way as to render it more readily and economically separable from the absorbent liquid.

Still another object of this invention is to produce polymers of formaldehyde having the desired uniform chemical and physical characteristics so as to meet the prescribed specifications.

And still another object of this invention is to accomplish the polymerization of formaldehyde and separation of the polymer readily and economically under uniform conditions and in an easily controlled system. Other objects and advantages of my invention will be made evident in the accompanying drawing and the following detailed description which illustrate my new invention.

In accordance with my invention, a formaldehyde-containing gaseous or liquid stream is contacted by a slurry of paraformaldehyde suspended in a formaldehyde-absorbent liquid. The contacting may be accomplished in a pipe line, or, in the case of substantial quantities of uncondensed vapors, countercurrently in an absorber, such as a packed column. The formaldehyde is absorbed and for the most part is polymerized on the surface of the suspended paraform particles. Thus larger and more readily separable particles of paraform are produced. After contacting the formaldehyde stream, the slurry may be equilibrated in a length of pipe or a vessel to allow time for additional polymerization. After polymerization, the slurry may then be cooled, if desired, by heat exchange. The near complete polymerization of formaldehyde, prior to indirect cooling in a heat exchanger, reduces the tendency of paraformaldehyde to be formed directly on the indirect cooling surfaces.

Cooling at this point may also be obtained without the use of indirect cooling surfaces, if desired, by the use of a sufficiently volatile absorbent and by reducing the pressure of the slurry so as to obtain autorefrigeration by flash vaporization of a portion of the absorbent. The absorbent vapors are then compressed and mixed with the vapors leaving the top of the distillation column. The use of a heat exchanger is preferred, however, because of its simplicity and economy of operation.

After cooling the slurry, a portion of the suspended solid paraformaldehyde is separated from the formaldehyde-absorbent liquid, and the remaining paraform is recycled as a slurry to the contacting operation. The above-mentioned equilibration, cooling, and separation operations may be performed in any order desired, such as cooling, equilibrating, and separating; or equilibrating, separating, and cooling the recycled slurry. Also, the equilibration and, when using the inert gas technique, the cooling operation may be omitted. The most important operation is contacting of the formaldehyde-containing stream with a slurry of paraformaldehyde suspended in a formaldehyde-absorbent liquid. The contacting operation may be performed either countercurrently, as in an absorber, in the case of substantial quantities of uncondensed vapors, or concurrently, as by mixing, in the case of small quantities of uncondensed vapors.

The paraform may be separated from the slurry by conventional methods of sedimentation, centrifugation, filtration, or a combination of these methods, followed by drying. In the solids-separation step when using the absorbent entrainer technique, ordinarily three streams are produced: (1) a thick paste or filter cake containing the paraform product to be dried, (2) a slurry of paraform to be recycled and contacted with the formaldehyde-containing stream, and (3) a stream of substantially clear absorbent entrainer which is refluxed to the distillation column. The particle size and chemical reactivity of the product paraform may be adjusted and controlled by regulation of the quantity of the recycled slurry and also by regulation of the paraform solids content of this stream. The chemical reactivity of the paraform may also be controlled by regulation of the slurry temperature, since the lower molecular weight, more reactive polymers tend to remain dissolved in the entrainer liquid as the temperature is raised.

In a special case, in the manipulation of slurry temperature and solids content, the polymerization of formaldehyde may be induced by shock cooling of the formaldehyde-entrainer stream by contacting and mixing with a relatively cold stream of substantially clear absorbent entrainer. Thus, only two streams would be required from the solids-separation step, with the clear absorbent entrainer being not only refluxed to the column, but also recycled for contacting the fractionating column overhead product. Shock cooling may also be accomplished by autorefrigeration of the formaldehyde-absorbent entrainer in a manner somewhat similar to that previously mentioned. The formaldehyde-entrainer stream is substantially completely condensed at an elevated pressure, but the degree of subcooling is limited to that consistent with avoidance of solid polymer deposits on the cooling surfaces. Additional cooling is then obtained by reduction in pressure and flash vaporization of a portion of the entrainer. Although polymerization and precipitation of paraform is induced by such cooling, the reduction in pressure is preferably preceded by admixture of at least a small quantity of paraformaldehyde slurry.

It will be apparent that only two streams, a slurry and the product paraformaldehyde, are required from the solids-separation step in the application of the present invention to the formaldehyde-inert gas mixture, wherein no liquid entrainer reflux to the column is used. Since the formaldehyde-inert gas mixture is already at about 80° F. and since there is no warm formaldehyde solution from which paraform may be rapidly precipitated by shock cooling, there is no need for a clear absorbent stream.

In addition to the above-described applications, my invention may be applied to methods well known in the arts to obtain new results in the formation and recovery of paraform. In Patent Number 1,905,033, Bond describes the concentration of formaldehyde solutions by pressure distillation, whereby formaldehyde is concentrated overhead. In Patent Number 1,871,019, Walker describes the concentration of formaldehyde by distillation and fractional condensation of the overhead vapors. By a combination of these two methods, an overhead stream of gaseous formaldehyde and water vapor may be produced wherein the concentration of formaldehyde is limited only by the practical necessity of avoiding deposition of solid paraform and plugging of the fractional condenser and the vapor transfer line. The tendency of these parts to become fouled may be lessened by circulating a rather hot cooling medium through the fractional condenser and by insulating or steam-packeting the vapor line.

Because of the paraform plugging difficulties encountered in the final condensation and polymerization of a formaldehyde-rich vapor, the prior art methods have striven to produce a concentrated aqueous solution of formaldehyde. However, in accordance with my invention, the overhead formaldehyde-rich vapor stream leaving the fractional condenser is condensed and absorbed by direct contact with a recycled aqueous paraformaldehyde slurry. This operation is preferably performed countercurrently in an absorber, such as a packed column. The formaldehyde is absorbed and polymerized and paraform is precipitated prior to contact with indirect cooling surfaces, which now do not become plugged.

In the solids separation step there are produced three streams as described above for the absorbent entrainer technique. In fact, water may be considered as an absorbent entrainer, inasmuch as it performs both functions in this case. After drying the thick paste or filter cake, paraformaldehyde is recovered as a powdered or fine-grained material.

The accompanying schematic flow sheet illustrates a preferred embodiment of my invention for a continuous operation, applied to a formaldehyde-containing stream produced by the formaldehyde-absorbent entrainer technique, by means of which the formaldehyde-containing stream is ordinarily prepared for purposes of the present invention. In the flow diagram, aqueous formaldehyde is distilled under pressure in the presence of a relatively volatile liquid entrainer reflux in distillation column 1. Feed to the column is introduced by means of pump 2, and heat is supplied to the column by means of steam coils 3, or alternatively, by sparged stream. Reflux, consisting of substantially clear liquid absorbent entrainer, is introduced near the top of the column through pipe 17 by means of pump 18. Also additional reflux is ordinarily provided by partial condenser 4 in order to reduce the heat load and slurry recirculation in the external cooling system. The column overhead vapor consisting primarily of gaseous formaldehyde and entrainer vapor is conducted by pipe 5 through back pressure control valve 6 and introduced into the bottom of absorber 7, wherein the rising vapors are directly contacted countercurrently with a slurry of paraformaldehyde suspended in the formaldehyde-absorbent entrainer liquid. Said slurry is introduced at the top of the absorber through line 8. Entrainer vapors are condensed and gaseous formaldehyde is absorbed by the slurry and polymerized primarily on the surface of the suspended paraformaldehyde particles. Noncondensible gases, if present, are purged through vent valve 9.

The resulting mixed slurry, stream 10, is discharged from the bottom of the absorber and passed through heat-exchange cooler 11 and equilibrator vessel 12, where the liquid remains in intimate contact with the suspended solid particles. The equilibrator preferably has sufficient volume to permit time for substantial approach to an equilibrium degree of polymerization at the slurry temperature. The equilibrated slurry is discharged through line 13 and divided, if desired, into a stream through by-pass valve 14 and centrifugal separator feed stream 15. The centrifugal separator 16 illustrated is a well-known type, which is capable of discharging three streams of different densities. In this case the low-density stream 17 is the substantially clear absorbent entrainer which is ordinarily joined with make up absorbent entrainer and sent by means of pump 18 to the top of distillation column 1 as reflux. The medium-density stream 20 is ordinarily a slurry, containing fine paraformaldehyde particles, and it is passed through valve 21 and recycled by pump 22 to the absorber 7. Slurry stream 20 may be joined with bypassed slurry from valve 14, and, if desired, may be thinned out by clear absorbent entrainer by opening valve 19. The slurry consistency may be adjusted also by speed regulation of the centrifugal separator 16. The recycle rate is controlled by flow controller 23. If desired, the flow controller 23 may be made responsive to the temperature of stream 10, rather than to the flow rate by orifice meter as shown. The high-density stream 24 is a thick slurry or paste which is admitted to dryer 25, from which the dry product paraformaldehyde is discharged into hopper 26.

In order to reduce the fire hazard the wet paraformaldehyde is preferably dried by means of warmed flue gas or re-circulated inert gas. Further, the volatilized entrainer is usually reclaimed by a recovery system (not shown), using such means as condensation and/or absorbtion by activated carbon, for example.

The three streams discharged by centrifugal separator 16 may be produced by other means or a combination of other means such as sedimentation and filtration. Also, as an alternative, slurry stream 20 may be replaced entirely by slurry recycled through valve 14. In this case the centrifugal separator 16 may be a more conventional two-discharge separator, or a filter, or some other solids concentrating device, such as a thickener. However, the arrangement illustrated permits maximum flexibility of operation in permitting wide variations in both solids content and circulation rate of the recycled slurry stream 8, by regulation of valves 14, 19, 21, and 23 and by adjustment of the centrifugal separator speed.

While the illustration presents a preferred embodiment of my invention, it is to be understood that I am not limited to the specific operations, apparatus, and manipulations described but that my invention is to be construed broadly within the scope of the appended claims.

What I claim is:

1. In the polymerization of formaldehyde to produce paraformaldehyde, the improvement which consists of introducing a relatively warm stream containing formaldehyde gas into a relatively cool slurry of solid paraformaldehyde particles suspended in a formaldehyde-absorbent liquid, thus producing desired larger particles of paraformaldehyde which are readily separable from said liquid.

2. In the polymerization of formaldehyde to paraformaldehyde, the improvement consisting of precipitating paraformaldehyde by mixing a warm stream of a formaldehyde absorbent liquid containing dissolved formaldehyde gas with a stream of finely divided paraformaldehyde particles suspended as a slurry in said formaldehyde-absorbent liquid, and cooling said mixed streams to a temperature suitable for polymerizing formaldehyde, thus producing desired larger and readily separable particles of paraformaldehyde.

3. In the polymerization of formaldehyde in a formaldehyde-absorbent liquid and the precipitation of paraformaldehyde therefrom, the improvement which consists of controlling the particle size of the paraformaldehyde product by contacting a gaseous formaldehyde containing stream with a recycled slurry comprised of fine paraformaldehyde particles suspended in said formaldehyde-absorbent liquid, separating the desired larger particles produced, and recycling the undesired finer particles in said recycled slurry; the recycled slurry being maintained at a temperature suitable for polymerization of formaldehyde to paraformaldehyde.

4. In the polymerization of formaldehyde in a gaseous formaldehyde-entrainer stream produced overhead by distillation of aqueous formaldehyde in the presence of reflux of said entrainer, the improvement for obtaining a uniform paraformaldehyde product of desired particle size and chemical reactivity which consists of contacting the relatively warm stream of said formaldehyde-entrainer mixture with a uniform proportion of a relatively cool slurry stream of paraformaldehyde particles suspended in said entrainer liquid so as to obtain a mixed stream of uniform intermediate temperature, cooling said mixed stream, separating paraformaldehyde particles of predetermined desired size from said mixed stream, and recycling the finer particles and a proportion of the entrainer liquid as the said slurry stream to said contacting operation, whereby said finer particles are enlarged to the desired particle size.

ALLEN G. EICKMEYER.

REFERENCES CITED

The following references are of record in the file of this patent:

UNITED STATES PATENTS

| Number | Name | Date |
| --- | --- | --- |
| 1,871,019 | Walker | Aug. 9, 1932 |
| 2,257,780 | Bludworth | Oct. 7, 1941 |
| 2,318,341 | Thompson | May 4, 1943 |
| 2,529,269 | Walker | Nov. 7, 1950 |